US012614367B2

(12) United States Patent
Chen et al.

(10) Patent No.: US 12,614,367 B2
(45) Date of Patent: Apr. 28, 2026

(54) IMAGE OUTPUT METHOD AND APPARATUS, COMPUTER DEVICE AND COMPUTER-READABLE STORAGE MEDIUM

(71) Applicant: INSPUR SUZHOU INTELLIGENT TECHNOLOGY CO., LTD., Jiangsu (CN)

(72) Inventors: Bei Chen, Jiangsu (CN); Tuo Li, Jiangsu (CN); Gang Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 385 days.

(21) Appl. No.: 18/259,864

(22) PCT Filed: Nov. 29, 2021

(86) PCT No.: PCT/CN2021/134143
§ 371 (c)(1),
(2) Date: Jun. 29, 2023

(87) PCT Pub. No.: WO2022/148180
PCT Pub. Date: Jul. 14, 2022

(65) Prior Publication Data
US 2024/0320950 A1 Sep. 26, 2024

(30) Foreign Application Priority Data
Jan. 7, 2021 (CN) ........................ 202110019483.X

(51) Int. Cl.
*G06V 10/44* (2022.01)
*G06T 5/10* (2006.01)
(Continued)

(52) U.S. Cl.
CPC ................ *G06V 10/44* (2022.01); *G06T 5/10* (2013.01); *G06V 10/761* (2022.01); *H04N 19/124* (2014.11); *G06T 2207/20052* (2013.01)

(58) Field of Classification Search
CPC ........ G06V 10/44; G06V 10/761; G06T 5/10; G06T 2207/20052; G06T 1/20;
(Continued)

(56) References Cited

U.S. PATENT DOCUMENTS

| | | | | |
|---|---|---|---|---|
| 5,710,595 A | * | 1/1998 | Hang | H04N 19/176 375/E7.181 |
| 8,171,169 B2 | * | 5/2012 | Bullard | H04L 67/131 358/426.14 |

(Continued)

FOREIGN PATENT DOCUMENTS

| | | |
|---|---|---|
| CN | 1468001 A | 1/2004 |
| CN | 101853504 A | 10/2010 |

(Continued)

OTHER PUBLICATIONS

Jinshan ("Image Enhancement Using a contrast Measure in the Compressed Domain") (Year: 2003).*

(Continued)

*Primary Examiner* — Solomon G Bezuayehu
(74) *Attorney, Agent, or Firm* — Dennemeyer & Associates LLC

(57) ABSTRACT

Disclosed are an image output method and apparatus, and a computer-readable storage medium. The method includes: acquiring an image continuous change feature of a display interface of a local server; generating image output control information according to the image continuous change feature and a preset image change threshold; and controlling amount of output image data according to the image output control information and network congestion information.

18 Claims, 9 Drawing Sheets

(51) Int. Cl.
*G06V 10/74* (2022.01)
*H04N 19/124* (2014.01)

(58) Field of Classification Search
CPC .. H04N 19/124; H04N 19/172; H04N 19/136; H04N 19/122; H04N 19/146
See application file for complete search history.

(56) References Cited

U.S. PATENT DOCUMENTS

| | | | | |
|---|---|---|---|---|
| 8,606,949 | B2 * | 12/2013 | Wogsberg | H04N 21/2343 709/230 |
| 8,818,037 | B2 * | 8/2014 | Noorkami | G06V 20/46 382/218 |
| 2006/0056508 | A1 * | 3/2006 | Lafon | H04N 19/124 375/E7.14 |
| 2008/0056376 | A1 * | 3/2008 | Bjontegaard | H04N 19/176 375/E7.176 |
| 2010/0271379 | A1 * | 10/2010 | Byford | G09G 5/363 345/545 |
| 2013/0094692 | A1 * | 4/2013 | Hernandez-Avalos | G06T 1/0021 382/100 |
| 2016/0196478 | A1 | 7/2016 | Choi et al. | |

FOREIGN PATENT DOCUMENTS

| | | |
|---|---|---|
| CN | 102208106 A | 10/2011 |
| CN | 106375755 A | 2/2017 |
| CN | 110418140 A | 11/2019 |
| CN | 110782442 A | 2/2020 |
| CN | 111212025 A | 5/2020 |
| CN | 111970518 A | 11/2020 |
| CN | 112804527 A | 5/2021 |

OTHER PUBLICATIONS

International Search report for PCT/CN2021/134143 mailed on Feb. 24, 2022.
Office Action for Chinese application 202110019483.X, filed Jan. 7, 2021.

* cited by examiner

Fig. 10

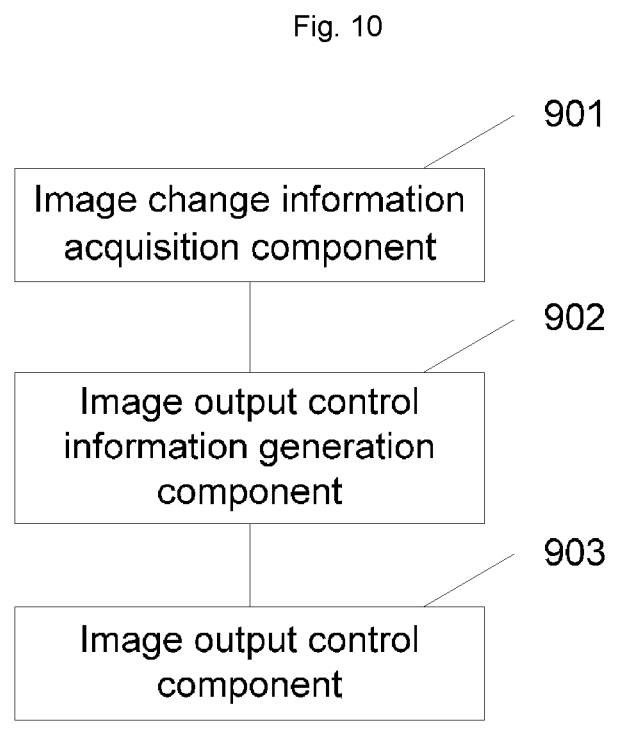

```
                                        ___ 901
   ┌─────────────────────────────────┐
   │   Image change information      │
   │    acquisition component        │
   └─────────────────────────────────┘
                   │
                                        ___ 902
   ┌─────────────────────────────────┐
   │     Image output control        │
   │  information generation         │
   │        component                │
   └─────────────────────────────────┘
                   │
                                        ___ 903
   ┌─────────────────────────────────┐
   │     Image output control        │
   │        component                │
   └─────────────────────────────────┘
```

IMAGE OUTPUT METHOD AND APPARATUS, COMPUTER DEVICE AND COMPUTER-READABLE STORAGE MEDIUM

CROSS-REFERENCE TO RELATED APPLICATIONS

This is a 35 U.S.C. 371 National Stage Patent Application of International Application No. PCT/CN2021/134143, filed Nov. 29, 2021, which claims priority to Chinese application 202110019483.X, filed Jan. 7, 2021, each of which is hereby incorporated by reference in its entirety.

TECHNICAL FIELD

The present disclosure relates to the field of computer technologies, and in particular, to an image output method and apparatus, a computer device, and a computer-readable storage medium.

BACKGROUND

In the related art, in a BMC (Baseboard Manager Controller), frame data of an image is compressed and cached first, and then the compressed image data is transmitted to a remote location via the network. In an image output process, when congestion occurs at an image output end, a write and read manner of an image cache is controlled by a certain rule; and when the output end cannot process the image cache data in time due to the congestion, several frames of the cache data which has not been transmitted is directly discarded, so as to prevent the congestion state from being transmitted to an image input end and affecting the entire image output path.

However, regarding such a method in which some cache frames are directly discarded without considering the features of the image data when congestion occurs at the network output end, although the processing procedure is simple, when severe congestion occurs in the network and a server interface image changes rapidly, the inventor realizes that the cache image frames discarded in the existing image output method may contain much interface change information; and after these image frames are discarded, abrupt change will occur in a presented visual interface, causing poor user experience, and being unable to meet the realistic demand of the user for high-quality image output.

SUMMARY

Embodiments of the present disclosure provide the following technical solutions:

one aspect of embodiments of the present disclosure provides an image output method, including:

an image continuous change feature of a display interface of a local server is acquired;

image output control information is generated according to the image continuous change feature and a corresponding image change threshold; and amount of output image data are controlled according to the image output control information and network congestion information.

In some embodiments, the image output control information is generated according to the image continuous change feature and the corresponding image change threshold includes:

an instruction for adjusting image compression quality is generated when a change smoothness degree within a current-frame image is greater than a preset image change threshold; and an instruction for keeping image quality unchanged is generated when the change smoothness degree within the current-frame image is not greater than the preset image change threshold.

In some embodiments, the image output control information is generated according to the image continuous change feature and the corresponding image change threshold includes:

high-frequency components and low-frequency components of the current-frame image are calculated by two-dimensional Fourier transform or DCT transform;

it is determined that the change smoothness degree within the current-frame image is greater than the preset image change threshold when a proportion value of the high-frequency components in a total number of the high-frequency components and the low-frequency components is greater than a preset proportion threshold; and it is determined that the change smoothness degree within the current-frame image is not greater than the preset image change threshold when the proportion value of the high-frequency components in the total number of the high-frequency components and the low-frequency components is not greater than the preset proportion threshold.

In some embodiments, the image output control information is generated according to the image continuous change feature and the corresponding image change threshold includes:

an instruction for unchanging the display interface is generated when similarity between adjacent images is greater than a preset image similarity threshold; and an instruction for changing the display interface is generated when the similarity between the adjacent images is not greater than the preset image similarity threshold.

In some embodiments, the image output control information is generated according to the image continuous change feature and the corresponding image change threshold includes:

mutual information between a current-frame image and a previous-frame image is calculated;

it is determined that the similarity between the adjacent images is greater than the preset image similarity threshold when the mutual information is greater than the preset image similarity threshold; and it is determined that the similarity between the adjacent images is not greater than the preset image similarity threshold when the mutual information is not greater than the preset image similarity threshold.

In some embodiments, the amount of output image data is controlled according to the image output control information and the network congestion information includes:

a quantization step size update value is calculated and/or an instruction for discarding an image cache frame is generated according to the image output control information and the network congestion information.

In some embodiments, the quantization step size update value is calculated according to the image output control information and the network congestion information includes:

the number of image frames to be sent at a current moment, a first moment and a second moment are acquired, and the first moment is earlier than the current moment, and the second moment is earlier than the first moment;

an initial quantization step size at the first moment in an image compression process is acquired;

network congestion change information is determined according to a numerical change relationship of the number of the image frames to be sent at the current moment, the first moment and the second moment; and the initial quantization step size is adjusted on a basis of the network congestion change information, to obtain a quantization step size at the current moment.

In some embodiments, before acquiring the image continuous change feature of the display interface of the local server, the method further includes:

when receiving an output control instruction, a step of acquiring the image continuous change feature of the display interface of the local server is executed.

Another aspect of embodiments of the present disclosure provides an image output apparatus, including:

an image change information acquisition component, configured to acquire an image continuous change feature of a display interface of a local server;

an image output control information generation component, configured to generate image output control information according to the image continuous change feature and a corresponding image change threshold; and an image output control component, configured to control amount of output image data according to the image output control information and network congestion information.

Embodiments of the present disclosure further provide a computer device, including a memory and one or more processors; and the memory stores computer-readable instructions, and when the computer-readable instructions are executed by the one or more processors, the one or more processors execute steps of the image output method according to any one above.

Finally, embodiments of the present disclosure further provide one or more non-transitory computer-readable storage medium storing computer-readable instructions; the computer-readable instructions, when executed by one or more processors, cause the one or more processors to execute steps of the image output method according to any one above.

Details of one or more embodiments of the present disclosure are proposed in the accompanying drawings and the description below. Other features and advantages of some embodiments of the present disclosure will become apparent from the description, the accompanying drawings, and the claims.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art will be introduced briefly. Apparently, the accompanying drawings in the following description merely relate to some embodiments of the present disclosure, and for a person of ordinary skill in the art, other accompanying drawings can also be obtained according to these accompanying drawings without involving any inventive effort.

FIG. 10 is a block diagram of one specific embodiment of an image output apparatus provided according to one or more embodiments of the present disclosure.

DETAILED DESCRIPTION OF THE EMBODIMENTS

Figure 1:
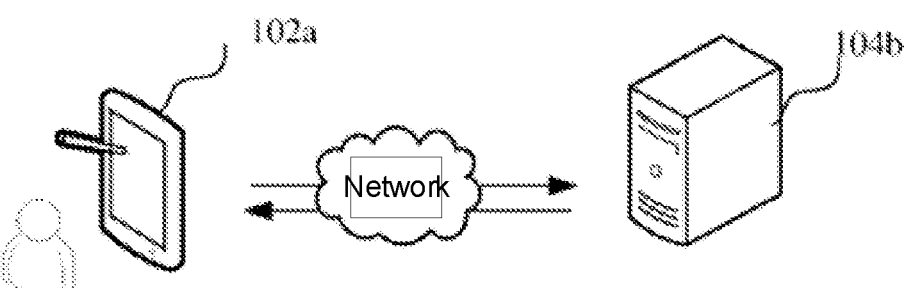
FIG. 1 is an application scenario diagram of an image output method provided according to one or more embodiments of the present disclosure.

To make a person skilled in the art better understand the solutions of some embodiments of the present disclosure, hereinafter, some embodiments of the present disclosure are further described in detail with reference to the accompanying drawings and the specific embodiments. Apparently, the embodiments as described are merely a part rather than all of the embodiments of the present disclosure. All other embodiments obtained by a person of ordinary skill in the art based on the embodiments of the present disclosure without any inventive effort shall all fall within the scope of protection of the present disclosure.

The terms "first", "second", "third", "fourth", and the like in the description, claims and the accompanying drawings of the present disclosure are used for distinguishing different objects, rather than for describing a specific sequence. In addition, terms "include" and "have" and any variations thereof are intended to cover non-exclusive inclusions. For example, a process, method, system, product or device that includes a series of steps or units is not limited to the steps or units listed, but may include steps or units not listed.

A BMC represents a series of monitoring and control functions in platform management, and an operation object thereof is system hardware, for example, monitoring the temperature, voltage, a fan, a power source, etc. of a system and performing corresponding adjustment work, it is ensured that the system is in a healthy state. The BMC is mainly used for collecting various information on a single server, and at the same time, providing same to upper-layer operation and maintenance network management software by means of two methods: a first method is that the BMC will provide various interfaces for query by upper-layer network management, such as human-machine interfaces like a web interface and a command line; and a second method is active reporting, upon detection that a fault occurs, the BMC can report the fault to a service end of the upper-layer network management software via means like a network, etc., so that operation and maintenance personnel can recognize and process the fault in time.

A web graphical interface provided by the BMC is a very intuitive and convenient interactive interface. The BMC supports a KVM (Keyboard Video Mouse) over IP service, and a visual interface between a local server and a remote administrator is constructed by the KVM service. A BMC chip transmits keyboard, mouse and image data required by a visualization service by means of a network interface. It can be understood that if transmitted image data is too large and a network environment is relatively complex, congestion easily occurs when directly transmitting the image data via the network, which affects a display delay of a server interface and further affects remote visualization experience. Thus, in the BMC, frame data of an image is compressed and cached first, and then the compressed image data is transmitted to a remote location via the network.

After the technical solutions of the embodiments of the present disclosure are introduced, hereinafter, various non-limiting embodiments of the present disclosure are described in detail.

An image output method provided in some embodiments of the present disclosure can be applied in an application environment as shown in FIG. 1. A terminal 102*a* and a local server 104*a* communicate with each other via a network. The terminal 102*a* may be, but is not limited to, various personal computers, notebook computers, smart phones, tablet computers, and portable wearable devices. The server 104*a* may be implemented by an independent server or a server cluster composed of a plurality of servers.

In some embodiments, the terminal 102*a* acquires an image continuous change feature of a display interface of the local server 104*a*, and generates image output control information according to the image continuous change feature and a corresponding image change threshold; and controls amount of output image data according to the image output control information and network congestion information.

Figure 2:
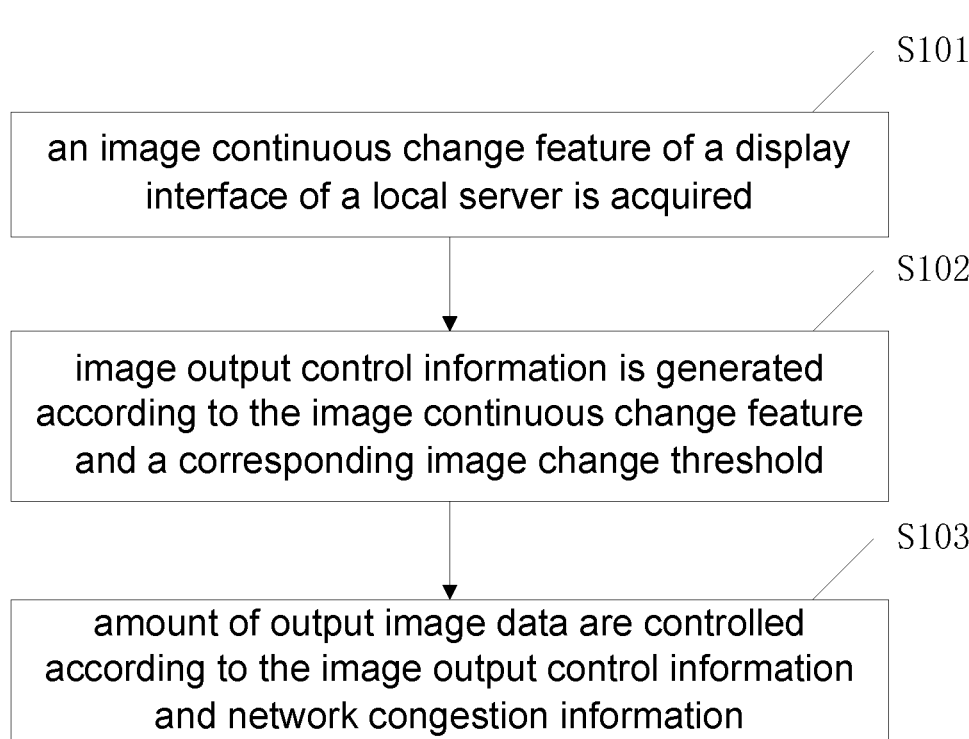
FIG. 2 is a schematic flowchart of an image output method provided according to one or more embodiments of the present disclosure.

First refer to FIG. 2, FIG. 2 is a schematic flowchart of an image output method provided according to embodiments of the present disclosure. The method being applied to the terminal in FIG. 1 is taken as an example for illustration. The embodiments of the present disclosure may include the following content:

S101: an image continuous change feature of a display interface of a local server is acquired.

The image continuous change feature in this step can be used to represent a change situation of multiple adjacent frames of images outputted by an image output end. In other words, the image continuous change feature represents a change degree between the multiple adjacent frames of the images. The change degree may include a color change degree, and may also include a content change degree. If the change degree is small, it proves that the difference between adjacent images is small. Even if one or two frames of the images are discarded or several frames of the images have low quality, this will not be easily perceived by a user's vision, and the visualization effect is still very good. If the change degree is large, it proves that the difference between the adjacent images is large. If one or two frames of images are discarded or several frames of images have low quality, this will be easily perceived by the user's vision, and the visualization effect is not good. For example, if a previous-frame image is a black-and-white image, and a current-frame image is an oil-painting image, these belong to two frames of images with a relatively large change degree; and if a previous-frame image is an automobile image, and a current-frame image is a material metallographic image, these also belong to two frames of images with a relatively large change degree. If a previous-frame image is a colored automobile image at a right viewing angle, and a current-frame image is a colored automobile image at a left viewing angle, these belong to two frames of images with a small change degree.

S102: image output control information is generated according to the image continuous change feature and a corresponding image change threshold.

It can be understood that if representation parameters of the image continuous change features are different, the image change thresholds corresponding to the representation parameters are also different. A person skilled in the art would have been able to select a suitable image continuous change feature and a corresponding threshold according to practical application scenarios, which does not affect the implementation of some embodiments of the present disclosure. The image output control information may be used to represent that whether amount of image output data and the change feature of a currently displayed image need to be controlled, for example, whether an output interface is substantially unchanged or is changing, and whether an interface image changes dramatically or changes smoothly. Of course, the image output control information may also include other parameters according to practical application scenarios. If there are a plurality of display ends, identifier information of corresponding display ends may be also carried in the image output control information.

S103: amount of output image data are controlled according to the image output control information and network congestion information.

The network congestion information in this step is used to represent amount of an image data that the image output end is waiting to send and/or is about to send. the amount of the output image data is controlled may include: a total amount of the output image data is reduced by reducing the number of output images by discarding image data frames; the total amount of the output image data can also be reduced by reducing the quality of some frames of images; or the total amount of the output image data is reduced by simultaneously discarding the image data frames and reducing the quality of some frames of the images; or a total amount of the data of the image output end is reduced by other ways.

In the technical solutions provided in the embodiments of the present disclosure, a continuous change feature of an image of the display interface of the local server is taken as a basis for a BMC to adjust an image encoding process. When congestion occurs at the image output end, data bandwidth requirement of a network output end can be relieved by reducing amount of image encoding frame data. The data bandwidth requirement of relieving the network output end is based on the quality of an image displayed at the output end, thereby effectively solving the current situation of poor output image quality caused by directly discarding image frames when network congestion occurs; and the quality of an output image can be ensured when adjusting the network congestion situation, thereby providing a better remote visualization experience for a user.

It should be noted that in some embodiments of the present disclosure, there is no strict order of execution between various steps, as long as these steps satisfy a logical order, and these steps may be executed at the same time, and may also be executed according to a certain preset order. FIG. 2 merely shows a schematic manner, and does not represent that the execution order can only be in this way.

It can be understood that the situation of controlling image output does not always need to be performed, and the entire process, i.e. S101-S103, needs to consume system resources and increase system power consumption. On this basis, in some embodiments of the present disclosure, before acquiring the image continuous change feature of the display interface of the local server, the method may further include:

it is determined whether an output control instruction is received; and when the output control instruction is received, executing S101-S103 in the embodiments above.

The output control instruction in this step is used for indicating whether to control output image data, that is, whether to execute the process of S101-S103. A person skilled in the art would have been able to select, according to actual situations, when to trigger the execution of S101-S103 at which situation, such as network congestion. For example, for the BMC, when a congestion situation does not occur at an image output component of the BMC, S101-S103 may not be executed, thereby saving power consumption of a BMC chip and reducing resource consumption. When a congestion situation occurs at the image output component, the work flow of S101-S103 is executed to reduce the amount of data at an image output port.

In the embodiments above, how to execute step S102 is not defined. In this embodiment, an image output control information generation manner is provided. In combination with FIG. 9, this step may include the following steps.

In this embodiment, a feature of an interface image of the local server includes two types: one is change intensity of luminance and chrominance inside the image, and the other is the degree of approximation between adjacent images.

As some optional embodiments, for the feature of the interface image of the local server acquired in step S101 is an image feature of the change intensity of the luminance and the chrominance inside the image, the change intensity of the luminance and the chrominance inside the image represents a change smoothness degree inside the image. For example, for a pure-color image, the change of the luminance and the chrominance thereof is particularly smooth; while for a colored oil painting, the change of the luminance and the chrominance thereof is relatively intense. If the pure-color image is to be processed by a compression method, a parameter with a larger compression ratio can be used; while if the colored oil painting image is to be processed, a parameter with a low compression ratio must be used, otherwise, the quality of an image after restoration will be affected. Correspondingly, the implementation process of S102 may be:

It is determined that whether a change smoothness degree within a current-frame image is greater than a preset image change threshold;

an instruction for adjusting image compression quality is generated when the change smoothness degree within the current-frame image is greater than the preset image change threshold; and an instruction for keeping image quality unchanged is generated when the change smoothness degree within the current-frame image is not greater than the preset image change threshold.

As some optional embodiments, high-frequency components and low-frequency components may be used to quantitatively evaluate the change intensity of the luminance and the chrominance inside the image or the change smoothness degree within the image. Correspondingly, the process of the step of "it is determined that whether the change smoothness degree within the current-frame image is greater than the preset image change threshold" may include:

high-frequency components and low-frequency components of the current-frame image are calculated by two-dimensional Fourier transform or DCT transform; and it is determined that whether a proportion value of the high-frequency components in a total number of the high-frequency components and the low-frequency components is greater than a preset proportion threshold.

In this embodiment, the two-dimensional Fourier transform or the DCT transform is used to calculate the high-frequency components and the low-frequency components of an image, so as to determine the change smoothness degree of the image. If the image changes dramatically, the high-frequency components of the image are large; and if the image changes smoothly, the low-frequency components of the image are large. When the change intensity of adjacent images reaches a certain threshold, an image cache component may be controlled to change the image quality.

As some other optional embodiments, parallel to the described embodiment, for the feature of an interface image of the local server acquired in step S101 is an image feature representing image similarity, the degree of approximation between adjacent images represents the degree of the approximation between a next interface image and a previous interface image. If the interface remains unchanged, then the adjacent images are completely the same, and at this time, even if several cache image frames are discarded, the interface interaction experience is not affected; however, if the interface changes dramatically, the difference between the adjacent images is large, and at this time, if cache frames are still discarded, abrupt change may occur at the interface. Correspondingly, the implementation process of S102 may be:

It is determined that whether similarity between adjacent images is greater than a preset image similarity threshold;

an instruction for unchanging the display interface is generated when the similarity between the adjacent images is greater than the preset image similarity threshold; and an instruction for changing the display interface is generated when the similarity between the adjacent images is not greater than the preset image similarity threshold.

As some optional embodiments, mutual information may be used to evaluate the similarity between the adjacent images. The process of the corresponding step of "it is determined that whether the similarity between the adjacent images is greater than the preset image similarity threshold" may include:

mutual information between a current-frame image and a previous-frame image is calculated; and it is determined that whether the mutual information is greater than the preset image similarity threshold.

In this embodiment, the degree of approximation between two images is confirmed by calculating the mutual information between the two images; and the larger the mutual information value, the larger the degree of the approximation between the two images. If the mutual information of the images reaches a certain threshold within a period of time, it is determined that the display interface of the current server remains substantially unchanged, and at this time, a data pressure at the image output end can be reduced by discarding cache frames, thereby relieving congestion situation while not significantly affecting the remote interface display effect. When the degree of the approximation between the adjacent images reaches a certain threshold, an image cache component may be controlled to discard image cache frames.

In the embodiments above, how to execute step S103 is not defined. This embodiment provides an implementation of controlling the amount of output image data, which may include the following steps:

a quantization step size update value is calculated and/or an instruction for discarding an image cache frame is generated according to the image output control information and the network congestion information.

The two control policies in this embodiment can be individually enabled, and can also be used in combination, thereby achieving an effect of adaptively controlling the image output quality.

In order to further ensure that the visualization experience of the user is not affected while the network congestion situation is relieved, on the basis of the described embodiments, some embodiments of the present disclosure also provide some other embodiments, which can adjust a quantization step size of an image encoding process in real time in combination with the change trend of network congestion, such that the image encoding quality smoothly and correspondingly changes according to the network congestion situation, and image display experience can be ensured while the network congestion situation is adjusted. Said embodiment may include:

the number of image frames to be sent at a current moment, a first moment and a second moment are acquired, and the first moment is earlier than the current moment, and the second moment is earlier than the first moment;

an initial quantization step size at the first moment in an image compression process is acquired;

network congestion change information is determined according to a numerical change relationship of the number of the image frames to be sent at the current moment, the first moment and the second moment; and the initial quantization step size is adjusted on a basis of the network congestion change information, to obtain a quantization step size at the current moment.

In this embodiment, the network congestion situation is continuously detected, and the number of the image frames, i.e. P, to be sent in the cache component is used as a quantization representation of the network congestion situation. When P value increases, it indicates that the congestion situation is increasing; and when P value decreases, it indicates that the network congestion situation is decreasing. In addition, for smoother control of image quality, in this embodiment, the selection of the quantization step size is not directly controlled by the increase or decrease of the P value, but the change trend of the quantized P value is used to add a control amount to the quantization step size. In some embodiments of the present disclosure, a schematic example is used to illustrate a calculation process of the quantization step size further in combination with FIGS. 3 to 7, i.e. an implementation of the step of "the initial quantization step size is adjusted on the basis of the network congestion change information, to obtain the quantization step size at the current moment".

In this embodiment, congestion values $P_a$, $P_b$ and $P_c$ at three points are detected at uniform intervals, and an interpolation $\Delta ba = P_b - P_a$ between congestion degrees at two points A and B and an interpolation $\Delta cb = P_c - P_b$ between congestion degrees at two points B and C are calculated. Then, when the quantization step size is selected, a correction value $\Delta Q_{step}$ is added to the quantization step size Qstep, and a calculation relational expression of $\Delta Q_{step}$ may be:

$$sign(\Delta cb) * \left( \frac{\Delta cb}{\Delta ba} \right).$$

The quantization step size of $P_c$ may be $$Q_{step-c} = Q_{step-b} + \Delta Q_{step} = Q_{step-b} + sign(\Delta cb) * \left( \frac{\Delta cb}{\Delta ba} \right),$$

and $sign(\Delta cb)$ represents taking the sign of $\Delta cb$; and when $\Delta cb$ is positive, $sign(\Delta cb) = 1$; and when $\Delta cb$ is negative, $sign(\Delta cb) = -1$.

Figure 3:
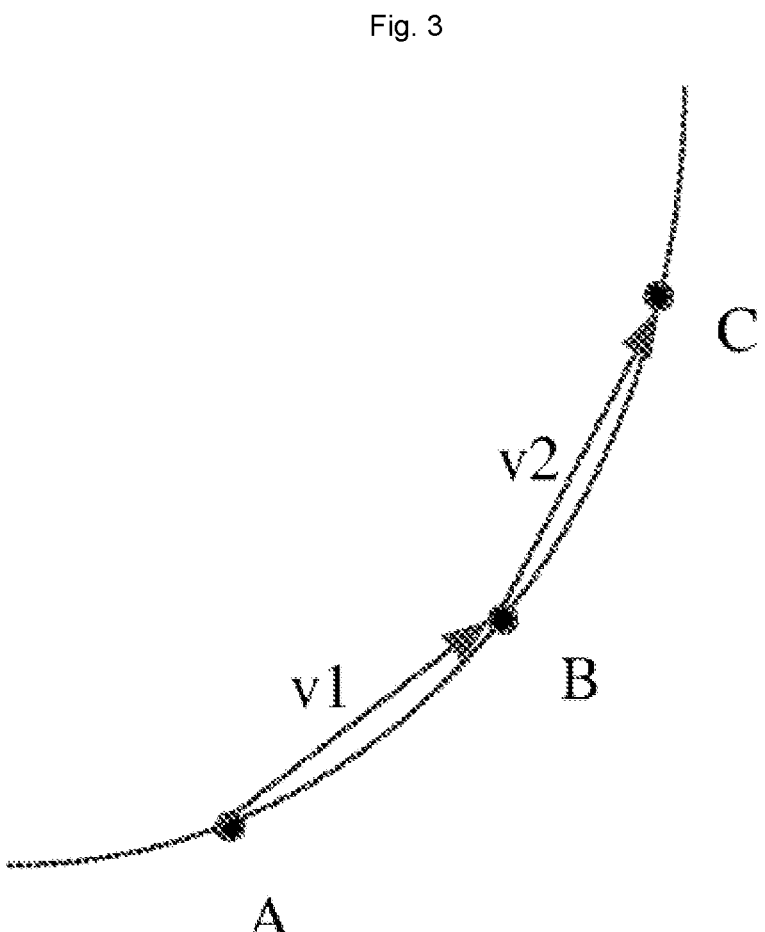
FIG. 3 is a schematic diagram of a change curve of a first network congestion degree in illustrative examples provided according to one or more embodiments of the present disclosure.

For example, if the network congestion degree changes according to the curve in FIG. 3, in the figure, the horizontal axis is time, and the vertical axis is the congestion degree P value; a slope of vector V2 from point B to point C is greater than a slope of vector V1 from point A to point B, it can be determined that the congestion degree increases rapidly. The correction value $\Delta Q_{step}$ will be a positive number greater than 1, that is, $\Delta Q_{step} > 1$. Thus, greater correction may be performed on $Q_{step-c}$ on the basis of $Q_{step-b}$, and image compression quality and amount of image data are further reduced, facilitating faster recovery of the network congestion situation.

Figure 4:
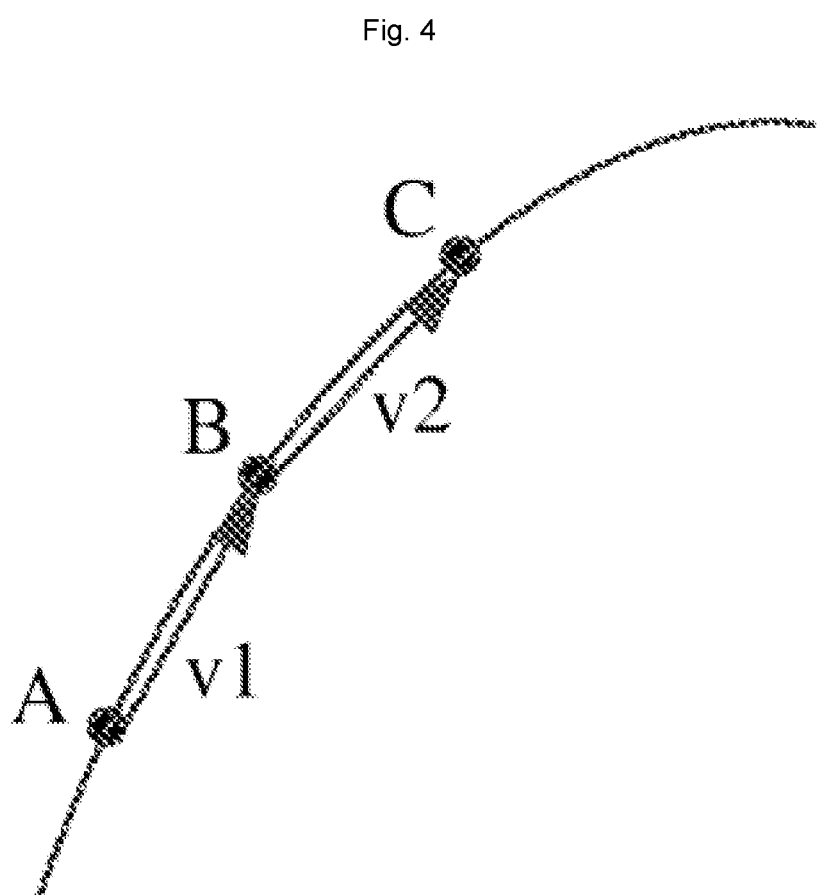
FIG. 4 is a schematic diagram of a change curve of a second network congestion degree in illustrative examples provided according to one or more embodiments of the present disclosure.

If the network congestion degree changes according to the curve in FIG. 4, a slope of vector V2 from point B to point C is greater than a slope of vector V1 from point A to point B, it can be determined that the congestion degree is still increasing, but there is a tendency of relieving. According to calculation, the correction value $\Delta Q_{step}$ will be a positive number greater than 0 and smaller than 1, that is, $1 > \Delta Q_{step} > 0$. Thus, correction will still be performed on $Q_{step-c}$ on the basis of $Q_{step-b}$. However, the amplitude of the correction value slows down, the quality decrease degree of image compression slows down, the compressed amount of image data decreases, but the recovery of the network congestion situation is still facilitated.

Figure 5:
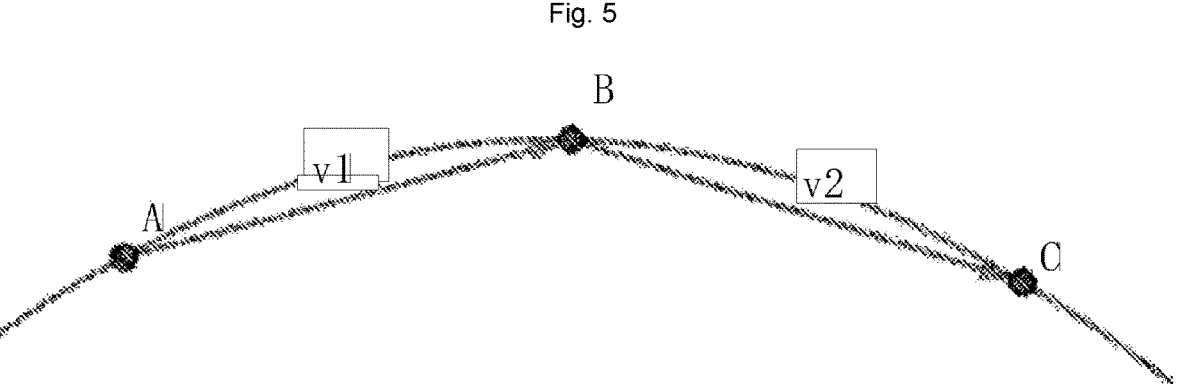
FIG. 5 is a schematic diagram of a change curve of a third network congestion degree in illustrative examples provided according to one or more embodiments of the present disclosure.

Further, if the network congestion degree begins to change according to the curve in FIG. 5, a slope of vector V1 from point A to point B is a positive value, but a slope of vector V2 from point B to point C becomes a negative value, which indicates that the congestion degree has started to decrease, and the congestion of an image transmission channel starts to be relieved. According to calculation, at this time, the correction value $\Delta Q_{step}$ will be a number smaller than 0, that is, $\Delta Q_{step} < 0$, and therefore, correction will still be performed on $Q_{step-c}$ on the basis of $Q_{step-b}$. However, the correction performed is reverse correction; and in cases where the congestion degree has started to be relieved, excessive increase of the quantization step size of image compression is avoided, which causes unnecessary image quality reduction.

Figure 6:
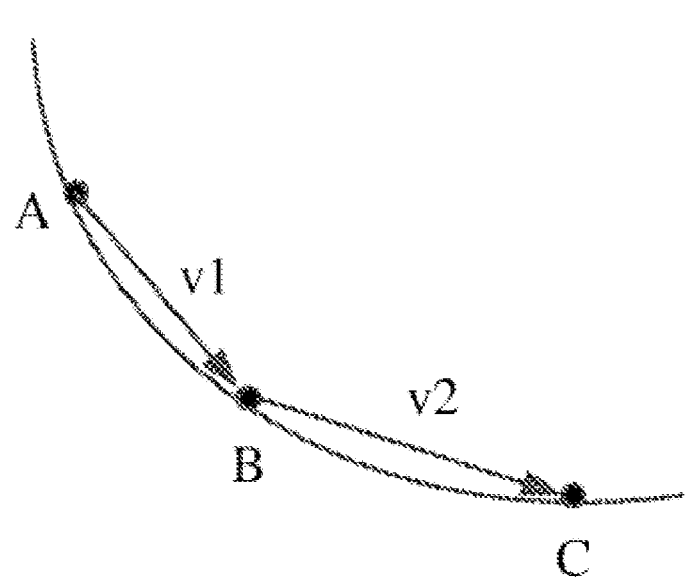
FIG. 6 is a schematic diagram of a change curve of a fourth network congestion degree in illustrative examples provided according to one or more embodiments of the present disclosure.

If the network congestion degree begins to change according to the curve in FIG. 6, a slope of vector V1 from point A to point B is a negative value, a slope of vector V2 from point B to point C is also a negative value, and the slope V2 is greater than V1, which indicates that the congestion degree has started to decrease rapidly. According to calculation, at this time, the correction value $\Delta Q_{step}$ will be a number smaller than 0 and greater than $-1$, that is, $-1 < \Delta Q_{step} < 0$, and therefore, correction will still be performed on $Q_{step\text{-}c}$ on the basis of $Q_{step\text{-}b}$. However, the correction performed is slow correction; and in cases where the congestion degree has indeed started to be relieved, excessive increase of the quantization step size of image compression is avoided, which causes unnecessary image quality reduction.

Figure 7:
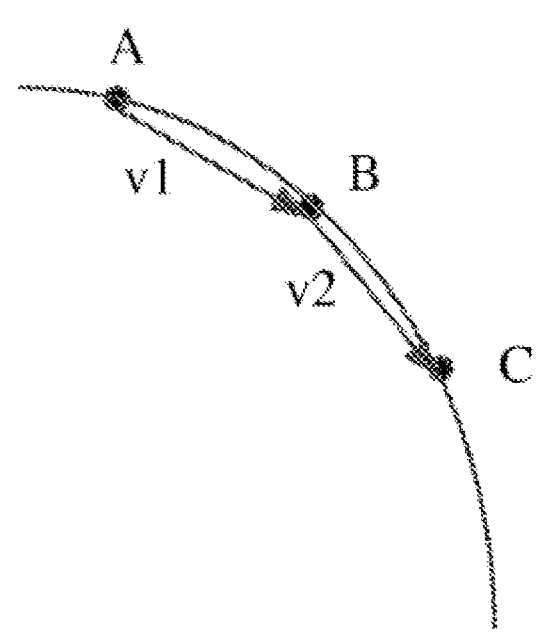
FIG. 7 is a schematic diagram of a change curve of a fifth network congestion degree in illustrative examples provided according to one or more embodiments of the present disclosure.

If the network congestion degree begins to change according to the curve in FIG. 7, a slope of vector V1 from point A to point B is a negative value, a slope of vector V2 from point B to point C is also a negative value, and the slope V2 is greater than V1, which indicates that the congestion degree has started to decrease rapidly. According to calculation, at this time, the correction value $\Delta Q_{step}$ will be a number smaller than $-1$, that is, $\Delta Q_{step} < -1$. Thus, $Q_{step\text{-}c}$ may accelerate correction and restoration on the basis of $Q_{step\text{-}b}$. A normal quantization step size restores rapidly in cases where the congestion degree has indeed started to relieve rapidly, thereby avoiding unnecessary image quality reduction.

Hence, in this embodiment, the change trend of the quantization step size for image encoding is adjusted in time in combination with the change trend of the current network congestion degree, to achieve slow change of the quantization step size, such that the image encoding quality transitions smoothly, thereby avoiding effect on user experience due to abrupt changes in image quality.

Figure 8:
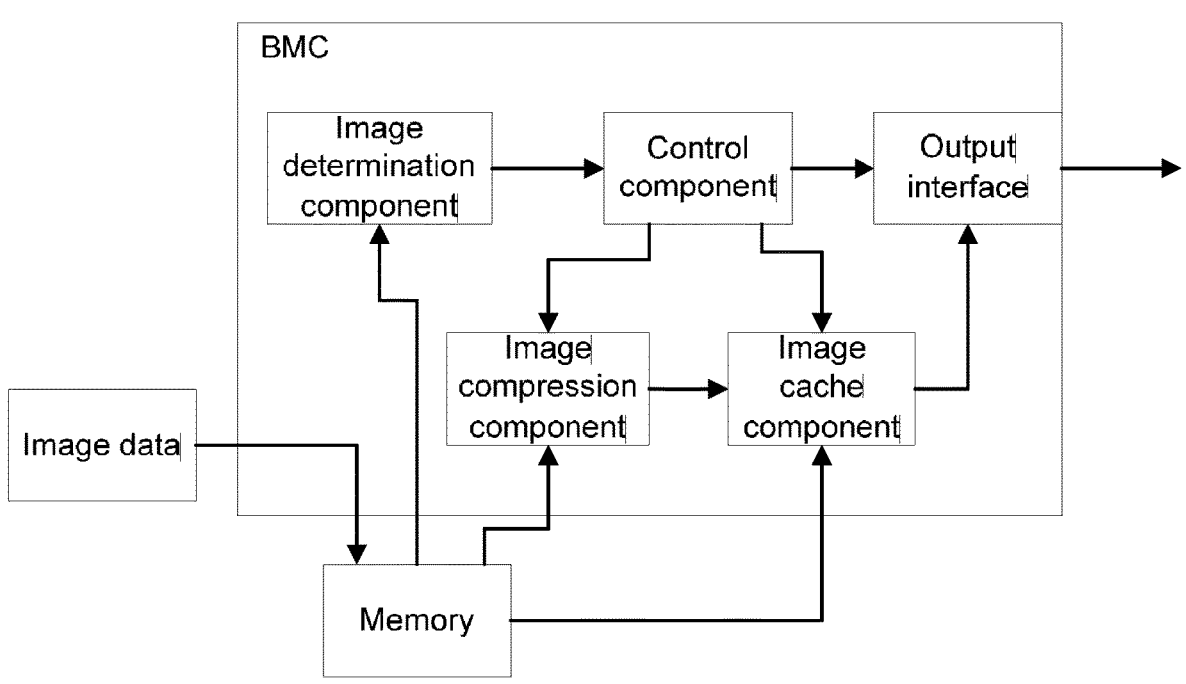
FIG. 8 is a schematic diagram of a framework of an exemplary application scenario provided according to one or more embodiments of the present disclosure.
Figure 9:
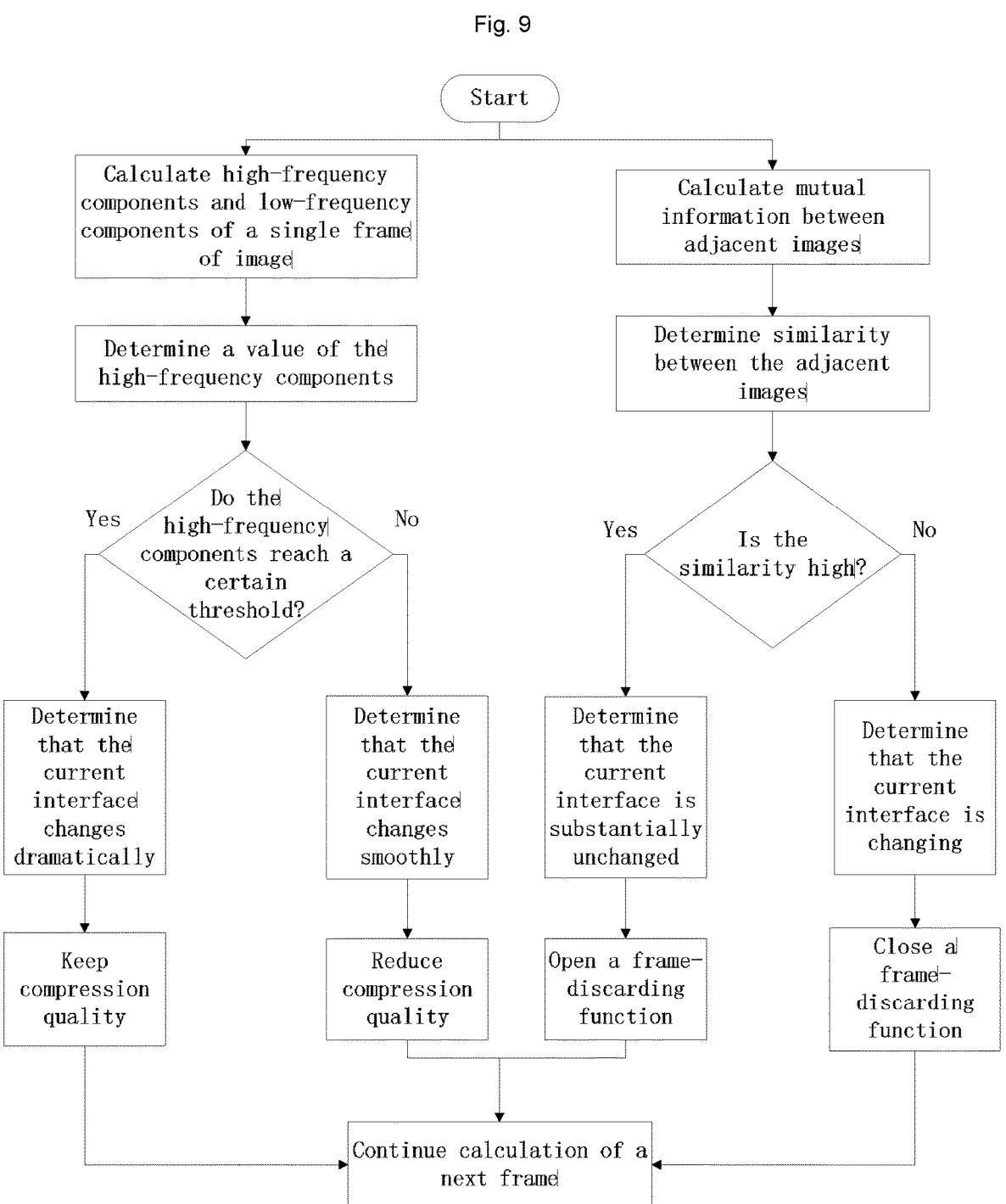
FIG. 9 is a schematic flowchart of determining an image change feature provided according to one or more embodiments of the present disclosure.

In order to make a person skilled in the art clearly understand the technical solutions of some embodiments of the present disclosure, some embodiments of the present disclosure provide a schematic example to describe the technical solutions of some embodiments of the present disclosure. Refer to FIGS. 8 and 9, this embodiment may include:

a BMC chip and a memory chip mounted on the BMC chip; image data of a host of a local server is transmitted to the BMC chip and then written into the memory chip. In the BMC chip, in addition to universal image compression component, image cache component and output interface, for implementation of some embodiments of the present disclosure, an image determination component is added and a control component is modified, such that the whole image output path can be optimized according to features of a server interface image.

Generally, the function of the image compression component is to read original image data from the memory, compress the original image data by a standard image compression method, obtain compressed data, and then write same into the image cache component. The image compression method performs processing according to a standard image encoding manner. Taking JPEG as an example, the compression process generally includes image segmentation, DCT transform, quantization, and entropy encoding processes. The DCT transform and quantization processes have an effect on image quality and the size of compressed data. The purpose of taking the quantization process as an example for quantization is to reduce an image encoding length without reducing a visual effect; the greater the quantization step size is, the more information is lost after compression, the smaller the amount of data are, the more "rough" the image display is after decoding and restoration; and the smaller the quantization step size is, the smaller information is lost, the larger the amount of the data are after image encoding, the more "fine" the image display is after decoding and restoration. The image cache component is composed of BMC memory resources, and caches compressed image data frames. The image cache component can accommodate a certain number of frames of compressed image data, and update the size and cache address of each frame of compressed image in real time. The output interface reads the compressed image data frame by frame from the image cache component, and transmits same to a remote end via a network. The image determination component is configured to acquire an image change feature of an interface of a local server, determine the image feature of the interface of the local server, and then send the determination result to the control component. There are mainly two kinds of features concerned by the image determination component: change intensity of luminance and chrominance inside the image, and the degree of approximation between adjacent images. The control component controls the image compression component and the image cache component to perform corresponding processing according to the determination result obtained by the image determination component. Generally, if a congestion situation does not occur at the image output end, the control component does not intervene in the image compression component and the image cache component. If a congestion situation occurs at the image output end, the control component starts to control the image compression component and the image cache component to reduce the amount of data at the image output end.

The BMC can control the compression quality of the image compression component and the frame discarding behavior of the image cache component, so as to effectively reduce the amount of data of the image output end, and relieve the congestion situation of the image output end. Specifically, when the change inside an image is gentle, the control component controls the image compression component to use a larger quantization step size when performing quantization, thereby reducing the image quality of the image compression processing and reducing the amount of data of the compressed image. In order to avoid a sudden change in the quantization step size caused by sudden congestion of a network interface of the BMC chip, which causes a jump in image quality, some embodiments of the present disclosure further add optimization control to the quantization step size of image compression. When the degree of approximation between adjacent images reaches a certain threshold, the control component controls the image cache component to discard image cache frames.

Hence, this embodiment can effectively reduce the amount of data requirement of the image output end of the BMC, and relieve the network congestion situation occurring at the image output end. According to the image feature of the interface of the local server, different methods are used in a targeted manner to reduce the amount of data of the image output end, so as to adaptively optimize remote image display quality, thereby providing good remote interface experience while relieving the congestion situation at the image output end, and providing more optimized remote visualization experience. Further, in combination with the change trend of the current network congestion degree, the change trend of a quantization step size for image encoding is adjusted in time, to achieve slow change of the quantization step size, such that the image encoding quality is adjusted smoothly, thereby avoiding effect on user experience due to abrupt changes in image quality.

The embodiments of the present disclosure also provide a corresponding apparatus regarding the image output method, thereby further making the method more practical. The apparatus may be described respectively from the perspective of functional components and the perspective of hardware. Hereinafter, an image output apparatus provided in embodiments of the present disclosure will be introduced. For the image output apparatus described below and the image output method described above, reference may be made to each other.

From the perspective of functional components, refer to FIG. 10, FIG. 10 is a structural diagram under one specific embodiment of an image output apparatus provided according to embodiments of the present disclosure. The apparatus may include:

an image change information acquisition component 901, configured to acquire an image continuous change feature of a display interface of a local server;

an image output control information generation component 902, configured to generate image output control information according to the image continuous change feature and a corresponding image change threshold; and an image output control component 903, configured to control amount of output image data according to the image output control information and network congestion information.

In some embodiments of this embodiment, the image output control information generation component 902 may include: an image smoothness degree enable subcomponent, and the subcomponent may be configured to:

determine whether a change smoothness degree within a current-frame image is greater than a preset image change threshold; generate an instruction for adjusting image compression quality when the change smoothness degree within the current-frame image is greater than the preset image change threshold; and generate an instruction for keeping image quality unchanged when the change smoothness degree within the current-frame image is not greater than the preset image change threshold.

As some optional embodiments of this embodiment, the image smoothness degree enable subcomponent may further be configured to:

calculate high-frequency components and low-frequency components of the current-frame image by two-dimensional Fourier transform or DCT transform; and determine whether a proportion value of the high-frequency components in a total number of the high-frequency components and the low-frequency components is greater than a preset proportion threshold.

In some other embodiments of this embodiment, the image output control information generation component 902 may include: similarity enable sub-component, and the sub-component may be configured to:

determine whether similarity between adjacent images is greater than a preset image similarity threshold; generate an instruction for unchanging the display interface when the similarity between the adjacent images is greater than the preset image similarity threshold; and generate an instruction for changing the display interface when the similarity between the adjacent images is not greater than the preset image similarity threshold.

As some optional embodiments of this embodiment, the similarity enable subcomponent may be further configured to:

calculate mutual information between a current-frame image and a previous-frame image; and determine whether the mutual information is greater than a preset image similarity threshold.

In some other embodiments of this embodiment, the image output control component 903 may also be a component which calculates a quantization step size update value and/or generates an instruction for discarding an image cache frame according to the image output control information and the network congestion information.

As some optional embodiments of this embodiment, the image output control component 903, for example, can further include a quantization step size calculation sub-component, and the sub-component can be configured to:

acquire the number of image frames to be sent at a current moment, a first moment and a second moment, and the first moment is earlier than the current moment, and the second moment is earlier than the first moment; acquire an initial quantization step size at the first moment in an image compression process; determine network congestion change information according to a numerical change relationship of the number of the image frames to be sent at the current moment, the first moment and the second moment; and adjust the initial quantization step size on a basis of the network congestion change information, to obtain a quantization step size at the current moment.

In some other embodiments of this embodiment, the apparatus, for example, may further include a trigger component, and the trigger component is configured to trigger, after receiving an output control instruction, the image change information acquisition component 901 to start working.

The functions of the functional components of the image output apparatus according to embodiments of the present disclosure may be specifically implemented according to the method in the method embodiments. For specific implementations thereof, reference can be made to related description of the method embodiments, and details will not be repeated herein.

Hence, the embodiments of the present disclosure can effectively solve the current situation of poor output image quality caused by directly discarding image frames when network congestion occurs; and the quality of an output image can be ensured when adjusting the network congestion situation, thereby providing a better remote visualization experience for a user.

Figure 11:
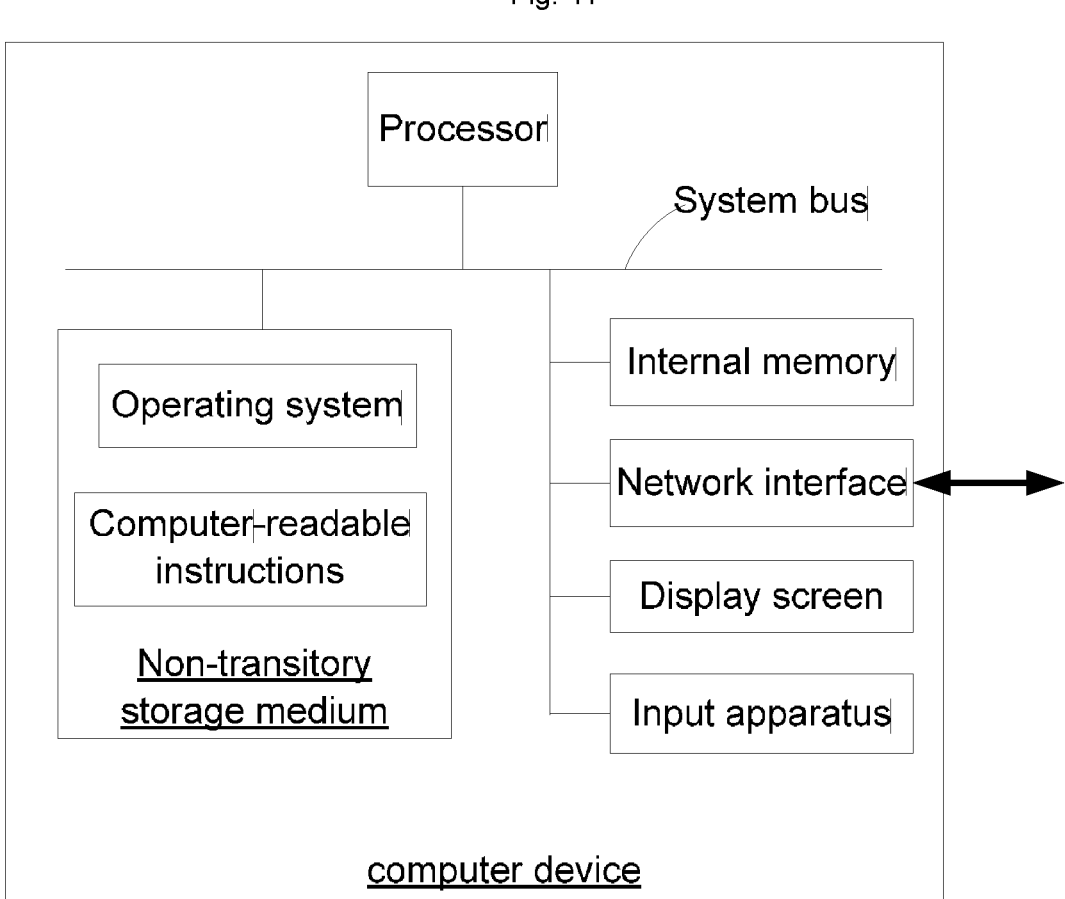
FIG. 11 is a schematic diagram of an internal structure of a computer device provided according to one or more embodiments of the present disclosure.

In some embodiments, a computer device is provided. The computer device may be a terminal, and the internal structural diagram thereof may be as shown in FIG. 11. The computer device includes a processor, a memory, a network interface, a display screen, and an input apparatus which are connected via a system bus. The processor of the computer device is used to provide computing and control capabilities. The memory of the computer device includes a non-transitory storage medium and an internal memory. The non-transitory storage medium stores an operating system and computer-readable instructions. The internal memory provides an environment for running of the operating system and the computer-readable instructions in the non-transitory storage medium. The network interface of the computer device is used to communicate with an external terminal via network connection. The computer-readable instructions are executed by the processor to implement the image output method. The display screen of the computer device may be a liquid crystal display screen or an electronic ink display screen; the input apparatus of the computer device may be a touch layer covered on the display screen, may also be a key, a trackball or a touch control panel arranged on the housing of the computer device, and may also be an external keyboard, a touch control panel or a mouse, etc.

The functions of the functional components of the image output apparatus according to embodiments of the present disclosure may be specifically implemented according to the method in the method embodiments. For specific implementations thereof, reference can be made to related description of the method embodiments, and details will not be repeated herein.

Hence, the embodiments of the present disclosure can effectively solve the current situation of poor output image quality caused by directly discarding image frames when network congestion occurs; and the quality of an output image can be ensured when adjusting the network congestion situation, thereby providing a better remote visualization experience for a user.

A computer device, including a memory and one or more processors; the memory stores computer-readable instructions, and when the computer-readable instructions are executed by the processors, the one or more processors implement the method above.

One or more non-transitory storage medium storing computer-readable instructions, and the computer-readable instructions, when executed by one or more processors, enable the one or more processors to execute the method above.

Hence, the embodiments of the present disclosure can effectively solve the current situation of poor output image quality caused by directly discarding image frames when network congestion occurs; and the quality of an output image can be ensured when adjusting the network congestion situation, thereby providing a better remote visualization experience for a user.

A person of ordinary skill in the art would understand that all or some processes of the method in the embodiments may be completed by computer-readable instructions instructing relevant hardware. The computer-readable instructions may be stored in a non-transitory computer-readable storage medium. When being executed, the computer-readable instructions may include the flow of the method embodiments above. Any references to memory, storage, database, or other medium used in the embodiments provided in the present disclosure may include a non-transitory memory and/or a transitory memory. The non-transitory memory may include read-only memory (ROM), programmable ROM (PROM), electrically programmable ROM (EPROM), electrically erasable programmable ROM (EEPROM), or flash memory. The transitory memory may include random access memory (RAM) or external cache memory. By way of illustration but not limitation, RAM may be available in a variety of forms, such as static RAM (SRAM), dynamic RAM (DRAM), synchronous DRAM (SDRAM), double data rate SDRAM (DDRSDRAM), enhanced SDRAM (ES-DRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Various technical features of the embodiments above can be combined in any way, and in order to make the description brief, all possible combinations of the technical features of the embodiments are not described. However, as long as the combination of these technical features is not contradictory, the technical features should be considered to fall within the scope disclosed in the description.

The embodiments as described above merely represent several embodiments of the present disclosure, and the illustration thereof is specific and detailed, but the specific and detailed illustration cannot be understood as limiting the patent scope of the present disclosure. It should be noted that for a person of ordinary skill in the art, several modifications and improvements can be made without departing from the concept of the present disclosure, and all these modifications and improvements fall within the scope of protection of the present disclosure. Therefore, the patent scope of protection of the present disclosure shall be subject to the appended claims.

What is claimed is:

1. An image output method, comprising:
acquiring an image continuous change feature of a display interface of a local server;
generating image output control information according to the image continuous change feature and a corresponding image change threshold; and
controlling amount of output image data according to the image output control information and network congestion information;
wherein controlling the amount of the output image data according to the image output control information and the network congestion information comprises:
executing, according to the image output control information and the network congestion information, at least one of following; calculating a quantization step size update value, generating an instruction for discarding an image cache frame;
wherein calculating the quantization step size update value according to the image output control information and the network congestion information comprises:
acquiring the number of image frames to be sent at a current moment, a first moment and a second moment, wherein the first moment is earlier than the current moment and the second moment is earlier than the first moment;
acquiring an initial quantization step size at the first moment in an image compression process;
determining network congestion change information according to a numerical change relationship of the number of the image frames to be sent at the current moment, the first moment and the second moment; and
adjusting the initial quantization step size on a basis of the network congestion change information, to obtain a quantization step size at the current moment.

2. The image output method according to claim 1, wherein generating the image output control information according to the image continuous change feature and the corresponding image change threshold comprises:
generating an instruction for adjusting image compression quality when a change smoothness degree within a current-frame image is greater than a preset image change threshold; and
generating an instruction for keeping image quality unchanged when the change smoothness degree within the current-frame image is not greater than the preset image change threshold.

3. The image output method according to claim 2, wherein generating the image output control information according to the image continuous change feature and the corresponding image change threshold further comprises:
calculating high-frequency components and low-frequency components of the current-frame image by two-dimensional Fourier transform or Discrete Cosine Transform (DCT) transform;

determining that the change smoothness degree within the current-frame image is greater than the preset image change threshold when a proportion value of the high-frequency components in a total number of the high-frequency components and the low-frequency components is greater than a preset proportion threshold; and determining that the change smoothness degree within the current-frame image is not greater than the preset image change threshold when the proportion value of the high-frequency components in the total number of the high-frequency components and the low-frequency components is not greater than the preset proportion threshold.

4. The image output method according to claim 1, wherein generating the image output control information according to the image continuous change feature and the corresponding image change threshold comprises:

generating an instruction for unchanging the display interface when similarity between adjacent images is greater than a preset image similarity threshold; and generating an instruction for changing the display interface when the similarity between the adjacent images is not greater than the preset image similarity threshold.

5. The image output method according to claim 4, wherein generating the image output control information according to the image continuous change feature and the corresponding image change threshold further comprises:

calculating mutual information between a current-frame image and a previous-frame image;

determining that the similarity between the adjacent images is greater than the preset image similarity threshold when the mutual information is greater than the preset image similarity threshold; and determining that the similarity between the adjacent images is not greater than the preset image similarity threshold when the mutual information is not greater than the preset image similarity threshold.

6. The image output method according to claim 1, wherein before acquiring the image continuous change feature of the display interface of the local server, the method further comprises:

executing, when receiving an output control instruction, a step of acquiring the image continuous change feature of the display interface of the local server.

7. A computer device, comprising a memory and one or more processors; wherein the memory stores computer-readable instructions, and when the computer-readable instructions are executed by the one or more processors, the one or more processors execute the method according to claim 1.

8. One or more non-transitory computer-readable storage medium storing computer-readable instructions, wherein the computer-readable instructions, when executed by one or more processors, cause the one or more processors to:

acquire an image continuous change feature of a display interface of a local server;

generate image output control information according to the image continuous change feature and a corresponding image change threshold; and control amount of output image data according to the image output control information and network congestion information;

wherein controlling the amount of the output image data according to the image output control information and the network congestion information comprises:

executing, according to the image output control information and the network congestion information, at least one of following: calculating a quantization step size update value, generating an instruction for discarding an image cache frame;

wherein calculating the quantization step size update value according to the image output control information and the network congestion information comprises:

acquiring the number of image frames to be sent at a current moment, a first moment and a second moment, wherein the first moment is earlier than the current moment, and the second moment is earlier than the first moment;

acquiring an initial quantization step size at the first moment in an image compression process;

determining network congestion change information according to a numerical change relationship of the number of the image frames to be sent at the current moment, the first moment and the second moment; and adjusting the initial quantization step size on a basis of the network congestion change information, to obtain a quantization step size at the current moment.

9. The image output method according to claim 1, wherein the image continuous change feature is used to represent a change degree between multiple adjacent frames of images, and the change degree comprises at least one of: a color change degree, a content change degree.

10. The image output method according to claim 1, wherein when there are a plurality of display ends, identifier information of corresponding display ends is carried in the image output control information.

11. The image output method according to claim 1, wherein the network congestion information is used to represent at least one of: amount of an image data that an image output end is waiting to send, amount of an image data that the image output end is about to send.

12. The image output method according to claim 1, wherein controlling the amount of the output image data according to the image output control information and the network congestion information comprises:

reducing quality of some frames of images to reduce total amount of the output image data according to the image output control information and the network congestion information.

13. The image output method according to claim 1, wherein adjusting the initial quantization step size on a basis of the network congestion change information, to obtain a quantization step size at the current moment comprises:

detecting congestion values $P_a$, $P_b$ and $P_c$ at three points at uniform intervals, and calculating an interpolation $\Delta ba = P_b - P_a$ between congestion degrees at two points A and B and an interpolation $\Delta cb = P_c - P_b$ between congestion degrees at two points B and C;

calculating a correction value $\Delta Q_{step}$ by a calculation relational expression as follow:

$$\operatorname{sign}(\Delta cb) * \left( \frac{\Delta cb}{\Delta ba} \right)$$

calculating the quantization step size at the current moment by a calculation relational expression as follow:

$$Q_{step-c} = Q_{step-b} + \Delta Q_{step} = Q_{step-b} + \text{sign}(\Delta cb) * \left(\frac{\Delta cb}{\Delta ba}\right),$$

wherein $\text{sign}(\Delta cb)$ represents taking the sign of $\Delta cb$; and when $\Delta cb$ is positive, $\text{sign}(\Delta cb)=1$; and when $\Delta cb$ is negative, $\text{sign}(\Delta cb)=-1$; A represents the second moment; B represents the first moment; C represents the current moment; $P_a$ represents a number of the image frames to be sent at the second moment; $P_b$ represents a number of the image frames to be sent at the first moment; and $P_c$ represents the number of the image frames to be sent at the current moment; $Q_{step}$ represents a quantization step size; $Q_{step-b}$ represents a quantization step size of $P_b$, and $Q_{step-c}$ represents a quantization step size of $P_c$.

14. The image output method according to claim 2, wherein controlling the amount of the output image data according to the image output control information and the network congestion information comprises:

executing, according to the image output control information and the network congestion information, at least one of following: calculating a quantization step size update value, generating an instruction for discarding an image cache frame.

15. The image output method according to claim 3, wherein controlling the amount of the output image data according to the image output control information and the network congestion information comprises:

executing, according to the image output control information and the network congestion information, at least one of following: calculating a quantization step size update value, generating an instruction for discarding an image cache frame.

16. The image output method according to claim 4, wherein controlling the amount of the output image data according to the image output control information and the network congestion information comprises:

executing, according to the image output control information and the network congestion information, at least one of following: calculating a quantization step size update value, generating an instruction for discarding an image cache frame.

17. The image output method according to claim 5, wherein controlling the amount of the output image data according to the image output control information and the network congestion information comprises:

executing, according to the image output control information and the network congestion information, at least one of following: calculating a quantization step size update value, generating an instruction for discarding an image cache frame.

18. The one or more non-transitory computer-readable storage medium storing the computer-readable instructions according to claim 8, wherein the computer-readable instructions, when executed by the one or more processors, cause the one or more processors to execute the steps:

generating an instruction for adjusting image compression quality when a change smoothness degree within a current-frame image is greater than a preset image change threshold; and generating an instruction for keeping image quality unchanged when the change smoothness degree within the current-frame image is not greater than the preset image change threshold.

\* \* \* \* \*